No. 607,455. Patented July 19, 1898.
G. H. PACAUD.
ATTACHMENT FOR BICYCLES.
(Application filed Mar. 30, 1897.)
(No Model.)
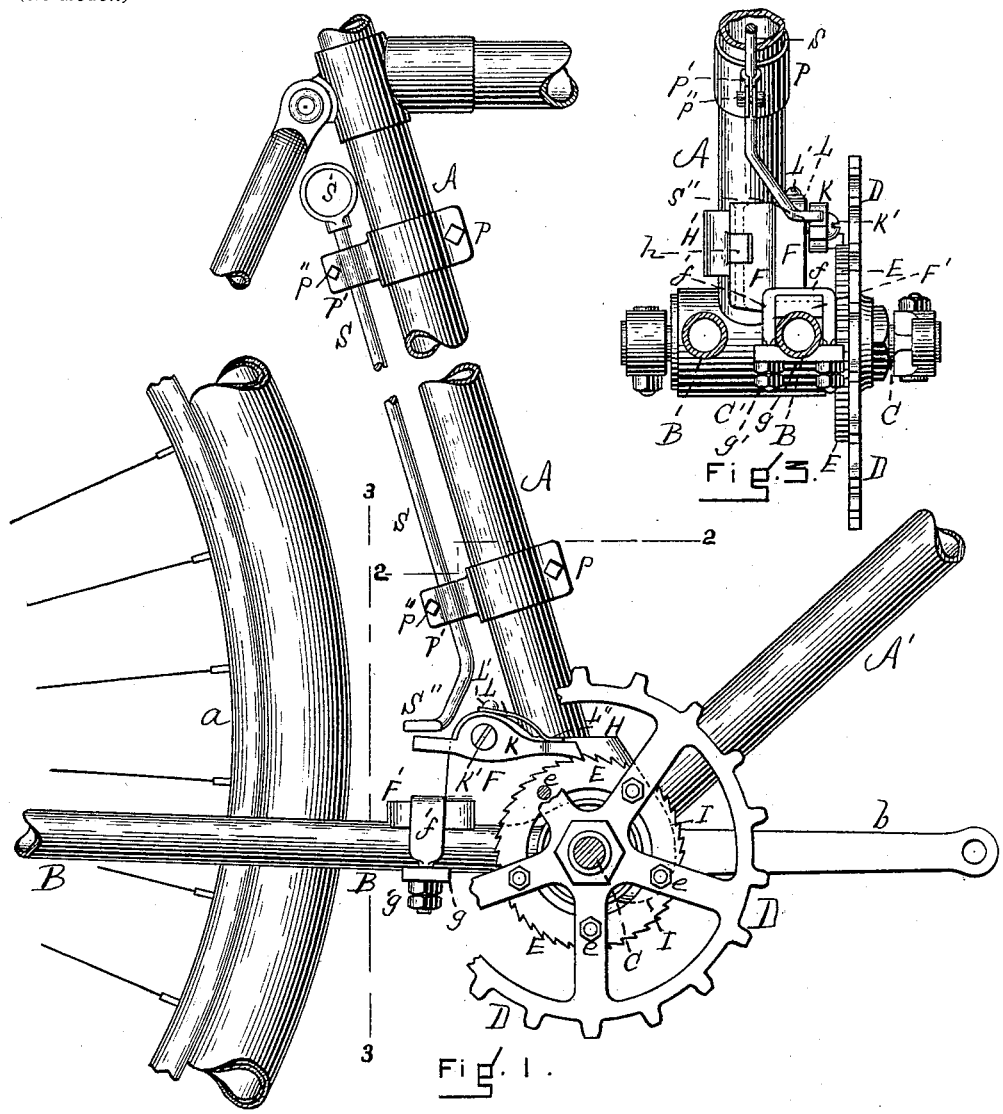
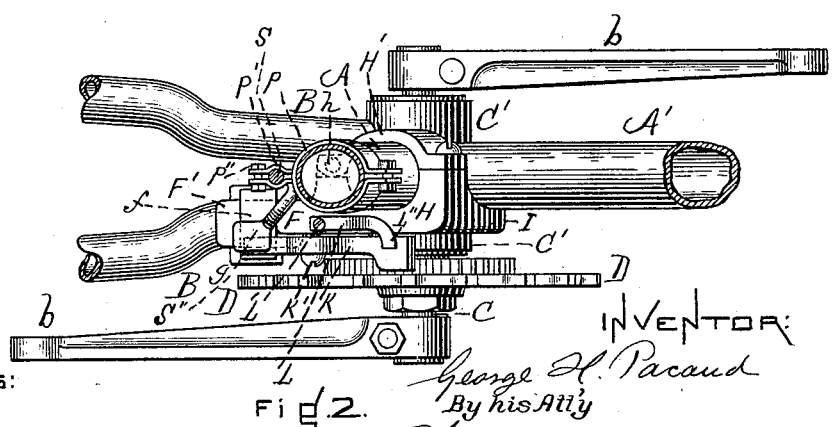
WITNESSES:
A. N. Bonney.
C. G. Graydon.
INVENTOR:
George H. Pacaud
By his Att'y
Henry Williams

UNITED STATES PATENT OFFICE.

GEORGE H. PACAUD, OF FALL RIVER, MASSACHUSETTS.

ATTACHMENT FOR BICYCLES.

SPECIFICATION forming part of Letters Patent No. 607,455, dated July 19, 1898.

Application filed March 30, 1897. Serial No. 629,977. (No model.)

*To all whom it may concern:*

Be it known that I, GEORGE H. PACAUD, a citizen of the United States, residing in Fall River, in the county of Bristol and State of Massachusetts, have invented a new and useful Improvement in Attachments for Bicycles, of which the following is a specification.

This is a device intended to be attached to that side of the frame of an ordinary bicycle on which the driving-sprocket is set; and the object of the invention is to facilitate or render more easy the driving of the machine, especially in hill-climbing.

In carrying out my invention I apply to the inner surface of the driving-sprocket—that is to say, the sprocket which is fast on the crank-shaft—a ratchet-wheel having peripheral teeth pointing in the opposite direction from the direction of the rotation of the sprocket-wheel when the machine is traveling forward. A pawl adapted to engage said ratchet is supported by a frame, which is of such a shape as to be applicable to that portion of the frame of the bicycle which is next the sprocket, and an operating-rod extends from the heel of the pawl up to a point within reach of the rider, so that the pawl may be held up out of contact with the ratchet or down upon it, as desired. When the pawl is upon the ratchet, as would be the case if the rider were climbing a hard hill, the ratchet slips under it while the machine is moving forward, but, the teeth being small and numerous, prevents the slightest backward movement and enables the rider to utilize every ounce of strength and without any loss, such as is apt to occur when he is changing the power of his pressure from one pedal to the other. At the moment of transferring the pressure from one pedal to the other there is a break in the application of power to the wheel. At this moment the ratchet serves to retain all the advantage gained by the pressure upon one pedal while such pressure is removed and pressure is applied to the other pedal. In climbing hills this is a decided advantage, as the strength of the rider is economized and all utilized.

The nature of the invention is fully described in detail below and illustrated in the accompanying drawings, in which—

Figure 1 is a side view of a sufficient portion of the frame and rear wheel of a bicycle to illustrate my attachment, which is applied thereto. In this figure a portion of the sprocket-wheel and a part of the rod which extends up to the seat are broken out in order to illustrate the device on a larger scale. The crank-shaft is shown in vertical section. Fig. 2 is a horizontal section taken on line 2, Fig. 1. Fig. 3 is a vertical section taken on line 3, Fig. 1, looking toward the front of the machine.

Similar letters of reference indicate corresponding parts.

A and A' represent portions of the frame of an ordinary bicycle, the former being the rod which supports the seat. B is the rear fork; $a$, the rear wheel; C, the driving-shaft; C', the yoke-hanger, through which the driving-shaft extends; $b$, the cranks, and D the sprocket-wheel, which is fast on the driving-shaft C and is connected by a chain in the ordinary manner with the rear wheel. All these parts are constructed as usual and require no further description.

E is a ratchet-wheel secured by bolts or rivets $e$ or other suitable means to the inner face of the sprocket D. The teeth on the periphery of this wheel are preferably small and numerous and point in the direction opposite to that of the rotation of the driving-shaft. Extending around the rod A and secured thereto and to the rear fork B is a metallic frame for supporting a pawl in position for engagement with the ratchet. This frame consists of the head F, provided with the rearward extension or horizontal lip F'. The parts F F' rest on the rear fork B and are held in such position by a metallic strap $f$, whose legs $f'$ are screw-threaded and extend through a bar $g$ on the under side of the fork B. Suitable nuts $g'$ hold the strap down upon the lip F'. From this head F extends horizontally a clamp interiorly of circular shape, so as to embrace the rod A. This clamp consists of two jaws—viz., the stationary jaw H and the swinging jaw H'. The stationary jaw is provided with a downward hook-shaped extension I, which extends partly around and slightly under the yoke-hanger, as indicated in Fig. 2 and by broken lines in Fig. 1. The movable jaw H' is hinged at $h$ to the main portion F, so as to open horizontally, in order that the two jaws may clamp around the rod A and be secured firmly thereupon by the screw h'. The inner sides of these jaws are not only formed on a circle, but are inclined or beveled, so as to accommodate the slant of the rod A. Thus this frame embraces the rod A, has its rear end held down upon the fork B, and has its front end prevented from vertical movement by the hook-shaped extension or finger I. This is for the purpose of insuring the engagement of the pawl K, which is pivotally secured at K' to the outer vertical surface of the head F and is held down into engagement with the ratchet E by the spring L, which is secured at one end at L' to the upper surface of the head F and has its free end curved outward at L'' in order that it may bear upon the pawl.

Secured to the rod A are clamps P, whose spring-jaws P' are formed to receive the rod S. This rod, which is provided with a suitable ring or handle S', extends down between the jaws P' of said clamps and is held friction-tight therein by suitable bolts P''. The lower end of this rod is provided with a foot S'', which is adapted to engage the heel K'' of the pawl.

When the rider is desirous of availing himself of the ratchet and pawl, as in climbing a hill, for example, the rod S is in a raised position, as shown. The pawl therefore slips over the ratchet-wheel E and prevents the least possible rearward movement or slip of the sprocket D, thus retaining for the rider the advantage gained by the pressure of one foot while the power is being shifted from that to the other foot. In level riding, however, the rider may, if he chooses, raise the pawl out of its engagement with the ratchet by slightly depressing the rod S S'. The clamps P P' are intended to embrace the rod with such a pressure as to hold it in any position, but still enable the rider to raise or lower it easily.

Having thus fully described my invention, what I claim, and desire to secure by Letters Patent, is—

In combination with the frame and driving-sprocket of a bicycle, the ratchet-wheel E rigidly secured to the inner surface of the sprocket-wheel; the frame or clamp consisting of the head F', the stationary jaw H extending from said clamp on one side of the seat-supporting rod, and provided with a finger I curving downward and under the yoke-hanger through which the driving-shaft extends, the movable jaw H' extending from said clamp, swinging horizontally thereon and extending on the other side of the seat-supporting rod, said jaws being formed interiorly to fit said seat-supporting rod and being adapted to clamp around the same, the lip F'' extending rearward from said head; mechanism for clamping said lip to the rear fork; and a pawl pivotally secured to the frame or clamp and adapted to engage the teeth on the ratchet-wheel, substantially as described.

GEORGE H. PACAUD.

Witnesses:
JOSEPH LACROIX,
J. M. MORTON, Jr.